C. A. MENDENHALL.
RESILIENT WHEEL.
APPLICATION FILED AUG. 2, 1922.

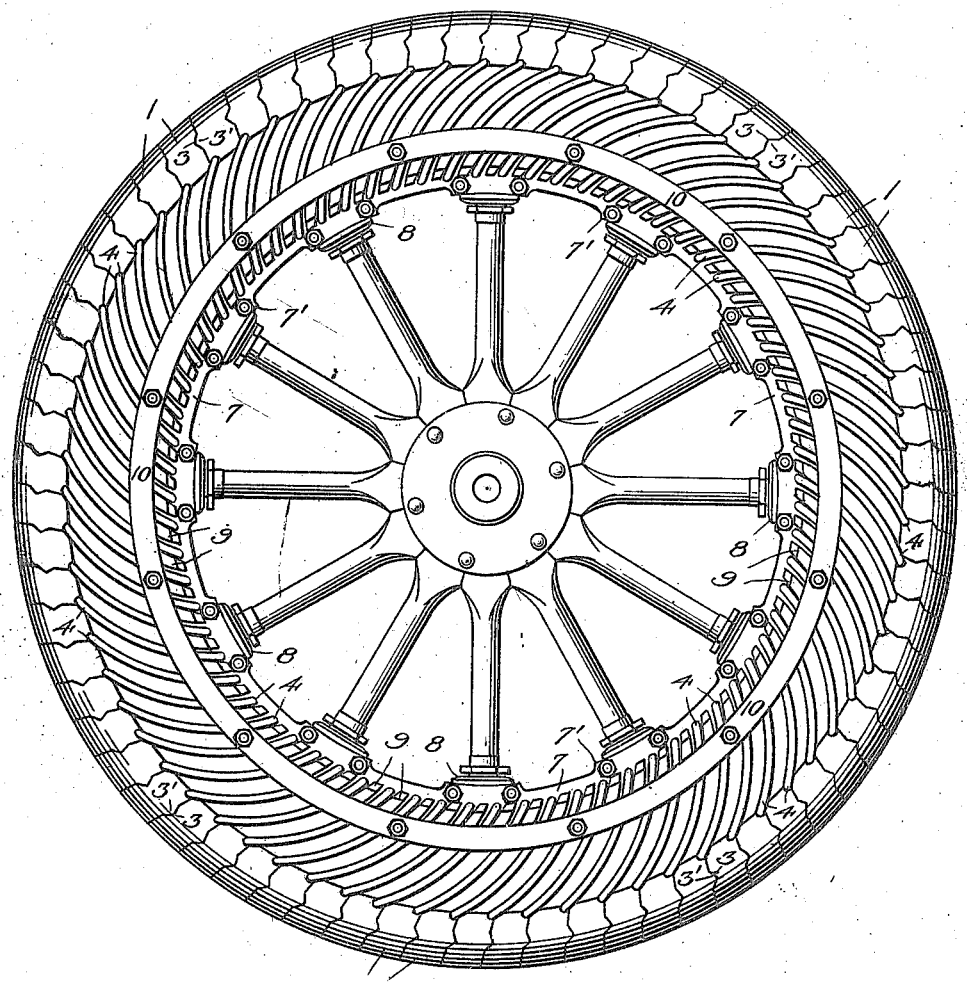

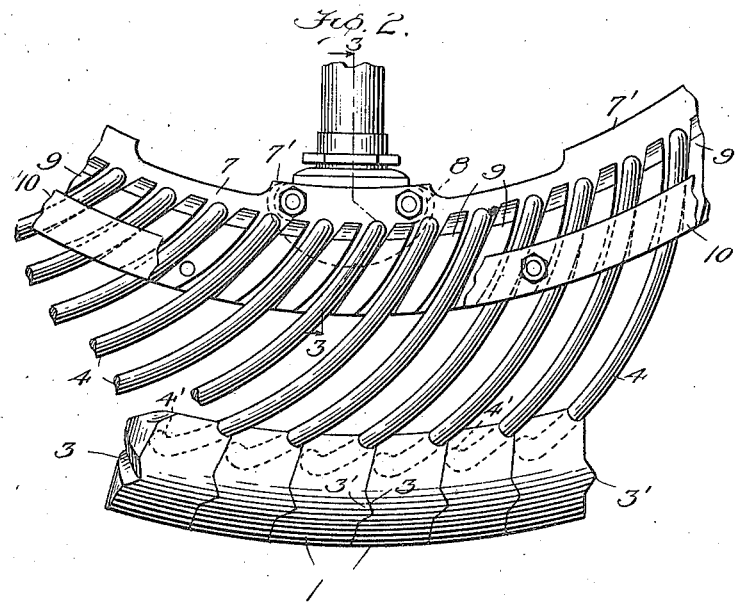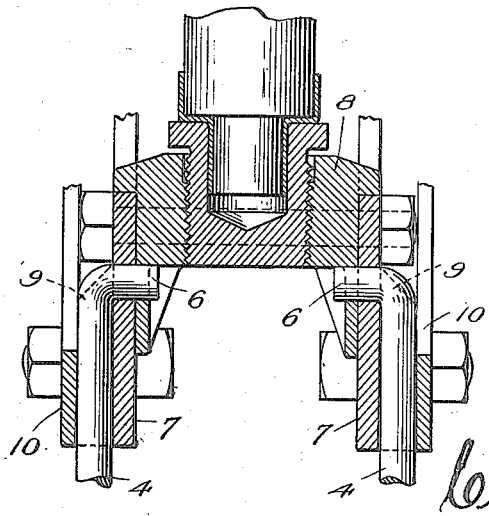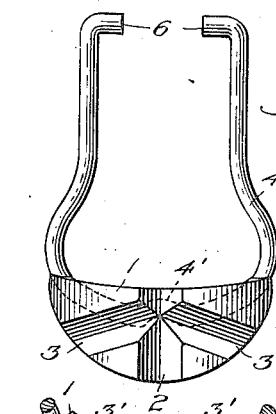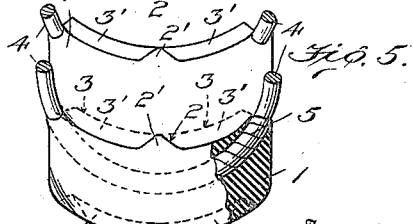

1,433,396.

Patented Oct. 24, 1922.
3 SHEETS—SHEET 3.

Patented Oct. 24, 1922.

1,433,396

UNITED STATES PATENT OFFICE.

CHARLES A. MENDENHALL, OF FARMLAND, INDIANA.

RESILIENT WHEEL.

Application filed August 2, 1922. Serial No. 579,116.

*To all whom it may concern:*

Be it known that I, CHARLES A. MENDENHALL, a citizen of the United States, residing at Farmland, in the county of Randolph and State of Indiana, have invented certain new and useful Improvements in Resilient Wheels; and I do hereby declare the following to be a full, clear, and exact description of the invention, such as will enable others skilled in the art to which it appertains to make and use the same.

My present invention relates to resilient vehicle wheels, more particularly for automobile use, as exemplified by U. S. Letters Patent Numbered 1,120,514, issued to me under date of December 8, 1914; Numbers 1,295,555 and 1,295,556, issued to me under date of February 25, 1919; and particularly No. 1,366,407, issued to me January 25, 1921.

This invention has for its primary object the production of resilient or cushion wheels, which employ neither outer casings nor inner tubes, and which are therefore both puncture and blow-out proof.

The invention has for a further object the production of wheels of the character aforesaid, which are comparatively inexpensive to manufacture, extremely durable and efficient in the accomplishment of their intended purposes, and not likely to become deranged or to get out of order.

A further object is the production of airless tires and wheels which require no inflating or pumping, and which at the same time are even more resilient than pneumatic tires.

A further object is the production of wheels having airless tires formed of a continuous contacting series of circumferentially arranged elastic tread members under slight compression, each carried by its individual suporting arm of spring material for affording additional resiliency.

With the foregoing and other objects in view the present invention consists in the general arrangement and combination of parts hereinafter particularly described and pointed out in the claims following.

In the accompanying drawings which illustrate a practical embodiment of my present invention, and whereon corresponding numerals refer to like parts in the several views:

Fig. 1 is a side elevation of a wheel and resilient tire, constituting my invention, assembled in operative relation;

Fig. 2 is a relatively enlarged fragmentary view in side elevation of the invention partly broken away for the purpose of disclosing the operative connections or spring supporting arms;

Fig. 3 is a transverse section of the invention taken on the zig-zag line 3—3 of Fig. 2;

Fig. 4 is a plan view of one supporting spring detached, together with its elastic road-contacting shoe;

Fig. 5 is also a plan view of two adjacent and interlocking shoes;

Reference being had to the accompanying drawings and numerals thereon, it will be observed that the invention comprises a multiplicity of individual tread members in contact and in circumferential alinement, a corresponding series of individual spring supports for said tread members, and a rim structure cooperatively arranged.

Figure 6:
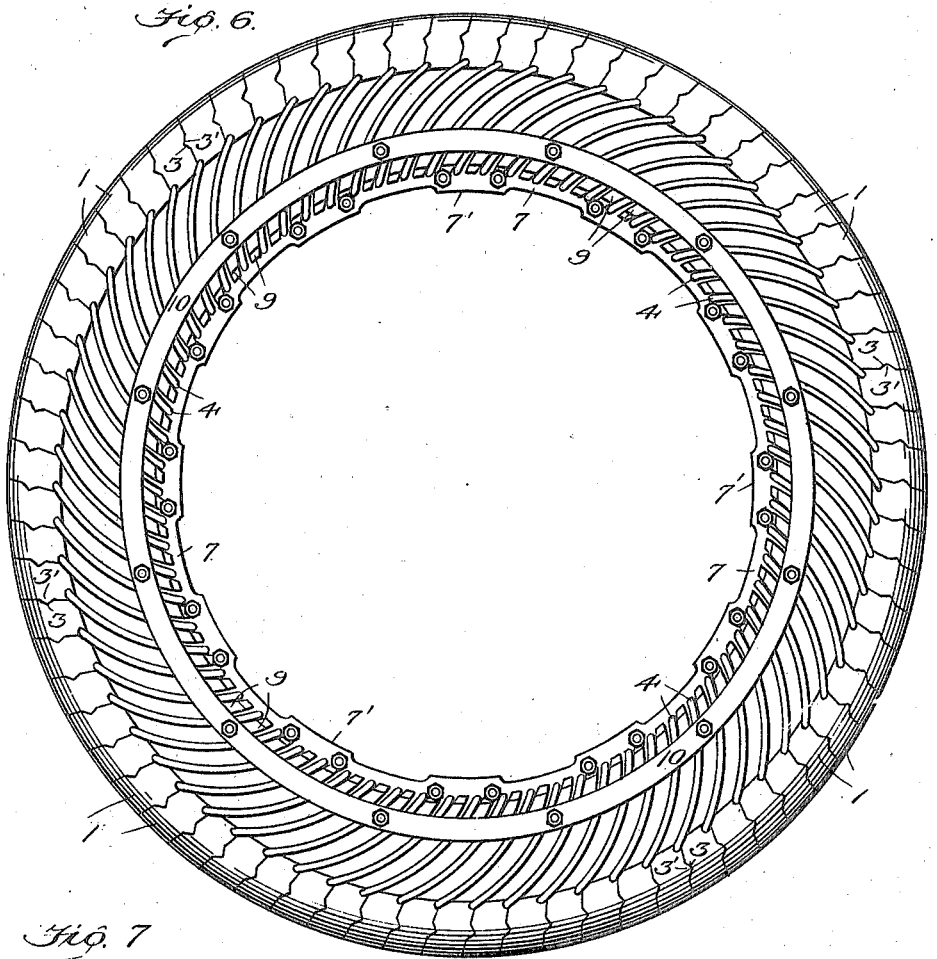
Fig. 6 is a side elevation like Fig. 1, of my invention arranged and adapted for use as a quick detachable structure.
Figure 7:
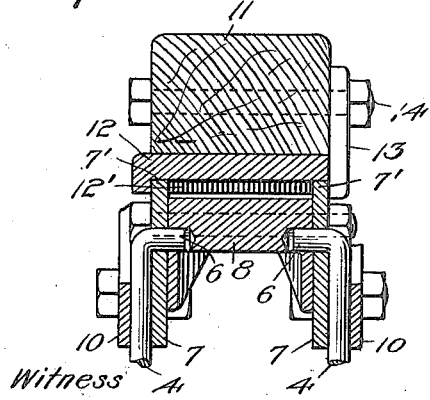
Fig. 7 is a transverse sectional view showing a wheel rim and my modified form of quick detachable tire applied thereto.
Figure 8:
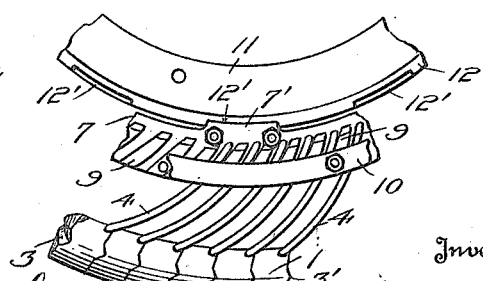
Fig. 8 is a fragmentary view in side elevation showing the modified structure represented by Figs. 6 and 7.

To this end a military wheel is formed as per Figs. 1 and 2 with the usual hub, spokes, and rim; or there is formed a detachable tire such as indicated by Figs. 6, 7 and 8, both embodying the novel characteristics of my present invention, and both containing a continuous circumferential series of tread blocks or shoes 1 or rubber or other elastic material, in contact and in circumferential alinement, having novel interlocking correlative surfaces as best shown by Figs. 4, 5 and 8.

These shoes 1 are counterparts of each other and are therefore interchangeable. They are formed with a vertical depression 2, and laterally intersecting depressions 3, 3, in their rear faces, and with corresponding projections 2′ and 3′, 3′ upon their advance faces throughout the entire cycle of the shoes, which are thus effectually interlocked against lateral or vertical displacement.

The arrangement of preferred form of said interlocking grooves 2, 3, 3, and projections 2', 3', 3', is best shown in plan by Fig. 4 of the drawings.

In practice the resilient shoes 1 aforesaid are assembled under suitable compression which further assists in maintaining them in operative and interlocked relation, and, as specifically set forth in my prior Patent No. 1,366,407, they are mounted upon the lower extremities of U-shaped springs 4 provided for that purpose. The lower extremities of said springs 4 are each provided with an upward central kink 4' as shown by dotted lines in Figs. 2 and 4, for the purpose of further preventing possible rotation of the shoes 1 upon their respective supporting springs, and it will be particularly noted that the upward trend of said kink or bend 4' will permit the shoe to wear down to a greater extent than if bent in a downward or opposite direction as in my former structure. In molding these shoes 1 in position upon the springs 4 aforesaid, it has been found advisable to coat the curved end of said springs with a preparation of glue, and to then wind the part so coated with a strip of tape or cotton fabric 5 to which latter the crude rubber will more readily adhere prior to the vulcanizing process.

The springs 4 at their opposite or inner ends are angled inwardly as at 6, 6, and are projected through oppositely disposed annular rim flanges 7, 7, which latter in turn are securely bolted to suitable couplings or equi-distant space blocks 8, and are provided upon their outer faces with spaced lugs 9, between which the springs 4 function as set forth in my aforesaid Letters Patent No. 1,366,407. The inner peripheries of said flanges 7 are provided with slight radial extensions 7' at equidistant points between spokes as shown by Figs. 1, 2, 6 and 8.

The present construction however, by reason of its triformed depressions 2, 3 and 3, and interlocking projections 2', 3' and 3', precludes all possibility of accidental displacement of shoes 1, after the several coupling or spacing members 8, the annular rim-flanges 7, 7, and the angular ends of all springs 4 have been assembled as aforesaid. As an additional means however, of binding the component parts of my present construction securely together, outside annular flanges or plates 10, 10, are provided, and securely bolted to both rim-flanges 7, 7, being offset therefrom by the lugs 9 aforesaid, and directly crossing the innermost ends of all springs 4.

When the aforesaid resilient tire is designed and arranged for use as a quick detachable structure, an ordinary wheel felloe 11, shown by Figs. 7 and 8, is employed. To this is secured an ordinary exterior felloe-band or seat 12 having at regular intervals transverse pockets 12', as best shown by Fig. 7, into which the radial extensions 7' may be introduced laterally, thus carrying in cluster, all tire parts heretofore described into the relative positions indicated by Figs. 7 and 8. This accomplished, ordinary and well understood retaining lugs 13 are secured to the wheel felloe 11 by means of bolts 14, in positions to close all transverse pockets 12' aforesaid, and to bear directly upon the outermost of rim flanges 7, thus retaining same securely in the position indicated by Figs. 7 and 8.

The foregoing being a description of my present invention, its use and operation as a resilient wheel for vehicles, particularly automobiles, is quite obvious, and need not be herein enlarged upon. The various mechanical and functional advantages ascribed to the structure of my former patents are also present in this, but in a greater degree of perfection, and in addition quick detachability and replacement of my improved form of tires is provided for.

While I have now set forth the best form of construction at present known to me, it should at the same time be understood that various changes in the arrangement and combination of parts may be made and substituted for those herein shown and described without in the least departing from the spirit of my invention as set forth in the following claims:

Having thus described my present invention what I now claim and desire to secure by Letters Patent is:—

1. A resilient wheel of the class described, including in combination oppositely disposed rim-flanges, a series of tire springs secured to said flanges, and a continuous elastic tire formed of a circumferential series of independent tread members carried by said springs and interlocked laterally and radially upon their contacting surfaces.

2. A resilient wheel of the class described including in combination oppositely disposed rim-flanges, a series of tire springs secured to said flanges, and a continuous elastic tire formed of a circular series of independent tread members carried by said springs in circumferential alinement and provided with complementary depressions and projections for interlocking them against lateral and radial displacement.

3. A resilient wheel of the class described, including in combination oppositely disposed rim-flanges, a continuous elastic tire made up of independent tread members in contact and in circumferential alinement interlocked laterally and radially by means of complementary ridges and depressions in said contacting surfaces, and a series of tire springs secured to said flanges each having an upward bend at its outer extremity embedded in its particular tread member.

4. A resilient wheel of the class described including in combination oppositely disposed rim-flanges, a series of tire springs secured to said flanges, a corresponding series of circumferentially continuous tread members each carried by one of said springs, and quick detachable means for securing said structure to a wheel rim.

In testimony whereof I affix my signature, in presence of two subscribing witnesses.

CHARLES A. MENDENHALL.

Witnesses:
R. G. ISENBARGER,
MILDRED E. JONES.